(No Model.)
J. B. TAWES.
OYSTER TONGS.
No. 449,012. Patented Mar. 24, 1891.
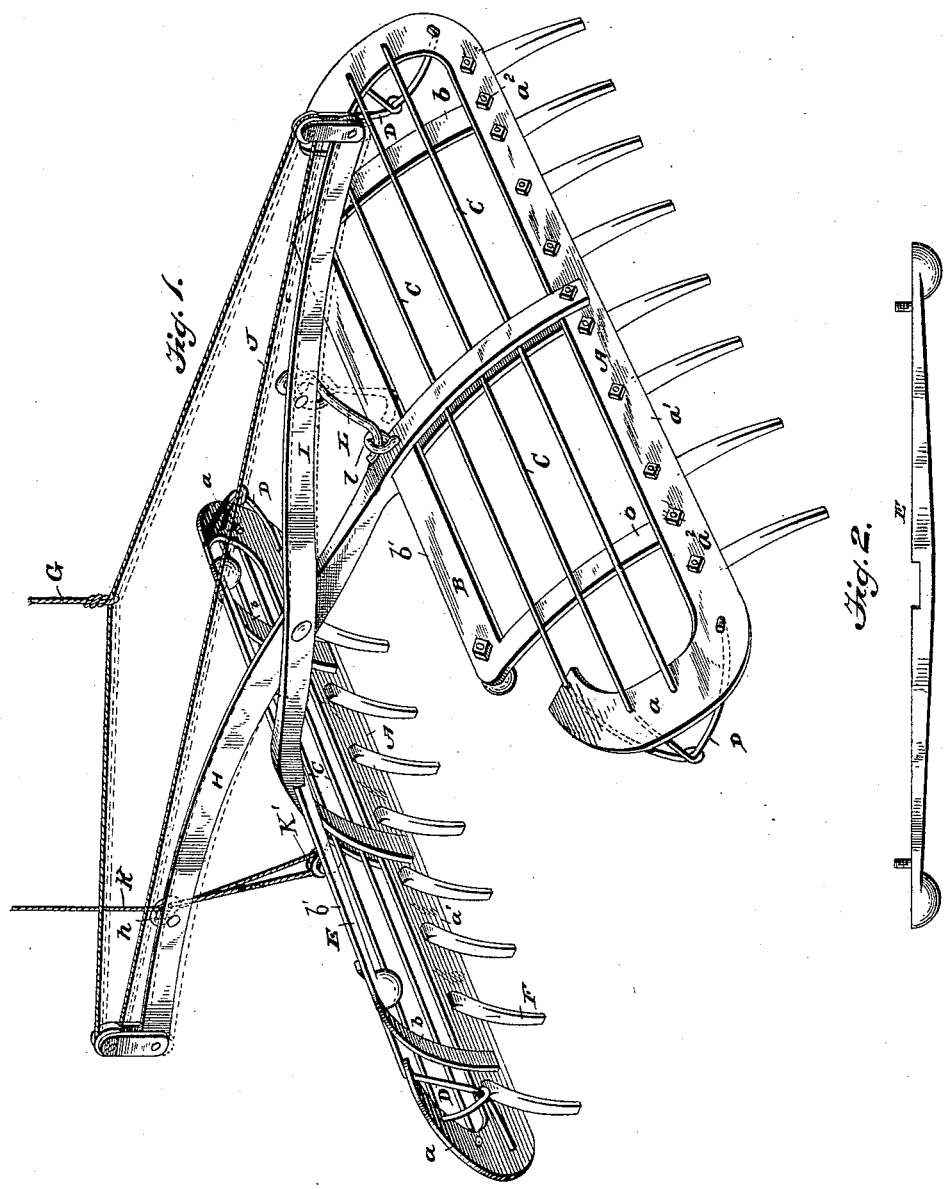
Witnesses:
Inventor:
James B. Tawes.
By, R. S. & A. P. Lacey
Attorney

UNITED STATES PATENT OFFICE.

JAMES B. TAWES, OF CRISFIELD, MARYLAND.

OYSTER-TONGS.

SPECIFICATION forming part of Letters Patent No. 449,012, dated March 24, 1891.

Application filed February 13, 1890. Serial No. 340,369. (No model.)

*To all whom it may concern:*

Be it known that I, JAMES B. TAWES, a citizen of the United States, residing at Crisfield, in the county of Somerset and State of Maryland, have invented certain new and useful Improvements in Oyster-Tongs; and I do hereby delare the following to be a full, clear, and exact description of the invention, such as will enable others skilled in the art to which it appertains to make and use the same.

This invention relates to oyster-tongs, and has for its object to improve the general construction of the same, whereby the efficiency and usefulness of this class of devices are increased and the same rendered more convenient to operate.

The improvement consists in the frame, which is composed of two U-shaped sections, the one placed within the other, side guards which prevent the oysters from slipping out between the jaws, weights to cause the teeth of the jaws to enter between the oysters, and a releasing-cord to detach the tongs from obstructions, all as hereinafter more fully described and claimed.

In the drawings, Figure 1 is a perspective view of the invention, showing the tongs open. Fig. 2 is a front view of the weights.

The tongs are composed of two members, each of which is constructed exactly alike. Hence a detailed description of one will suffice for both. The frame comprises the two U-shaped sections A and B. The section A is considerably larger than the section B, and its end pieces $a$ are curved inward, thereby giving the ends of the jaws a rounded appearance, which is preferable to any other form. The section B is placed within the section A, the ends $b$ thereof being secured to the side $a'$ of section A, preferably by having the extremities threaded and passed through suitable openings in the said side $a'$, and provided with nuts $a^2$. The ends $a$ terminate about in the same plane as the sides $b'$ of the section B. The wires C, placed between the ends $a$ and secured thereto, form a guard to retain the oysters between the jaws. The end guards D for retaining the oysters between the jaws of the tongs may be formed in any desired manner, and for economy of construction are made by extending the wires C and bending them in the required shape. The weights E cause the teeth F, which are attached to the lower edge of the frame, to enter between the oysters and also to assist in closing the jaws when the lifting cord or rope G is pulled on. These weights E are attached to any convenient part of the jaws, and are preferably long bars to distribute the weight over a large area. The bulk of the weight is arranged at the ends of the bars, as shown at $e$ $e$, to balance the tongs.

The levers H and I, having the jaws at their lower ends and sheaves at their upper ends, are pivoted midway of their ends. The lower ends of the levers are separated and the separated portions embrace the jaws and are secured thereto. The endless cord J passes around the sheaves at the ends of the levers, and the elevating-cord G is secured to one side thereof. To one of the levers, as H, is attached the guide-loop $h$ and one end of the releasing-cord K, which passes over sheave K' and up through the said guide-loop $h$ to within convenient reach, is adapted to be pulled upon to detach the tongs from stones and other obstructions.

The tongs are held open or distended, when lowering, by the hook L and eye $l$, the former being attached to lever I, the latter to the jaw at the end of the lever H, as shown. When the tongs rest upon the bed of oysters, the lifting-rope slackens and the ends of the levers fall sufficiently to permit the hook L to automatically disengage itself from the eye $l$. This will be readily understood when it is remembered that the hook is hung to one side of the eye $l$ and arranged so as to fall therefrom when the tongs settle.

The operation of the device is as follows: The tongs are separated or opened and held in this position by the hook and eye, as previously described, and is lowered. When the tongs touch the bed, the hook is disengaged from the eye, and the weights E cause the teeth to enter the bed. Now the cord G is drawn upon and the tongs close, the jaws thereof gathering in the oysters and retaining them. In the event of the jaws engaging with a stone or other obstruction the tongs can be readily detached by drawing or jerking upon the releasing-cord.

As hereinbefore specified, each jaw is composed of two approximately U-shaped frames A and B, and to describe more particularly each frame it may be stated that the frame A is composed of the bottom bar $a'$ and the end bars $a$, which, with said bar $a'$, form an approximately U-shaped frame. The frame B comprises the bar $b'$ and the end bars $b$, the three bars being disposed, as shown, to form an approximately inverted-U-shaped frame.

Having thus described my invention, what I claim, and desire to secure by Letters Patent, is—

1. In an oyster-tongs, the hereinbefore-specified jaw, comprising two U-shaped frames arranged with the closed side of one frame opposite the open side of the other frame, and the bent ends of the smaller frame being secured to the closed side of the larger frame, substantially as described.

2. In an oyster-tongs, the hereinbefore-specified jaw, comprising two U-shaped frames, the closed end of one frame being opposite the open side of the other frame, the ends of the smaller frame being threaded and passed through openings in the closed side of the larger frame, and nuts placed on said threaded ends, substantially as described.

3. In an oyster-tongs, the combination, with the jaw composed of two U-shaped frames arranged as described, of the wires C, extending between and secured to the extreme end bars, substantially as described.

4. In an oyster-tongs, the combination, with the jaws, of end guards projecting at right angles from the faces of the jaws and forming an integral part of the guard-wires, substantially as described.

5. In an oyster-tongs, the combination, with the jaw having two U-shaped frames placed as described, of wires placed between and secured to the extreme end bars, said wires being extended and bent to form end guards, substantially as described.

6. In an oyster-tongs, the combination, with the levers having jaws, of weighted bars E E, rigidly secured to each of the said jaws, the bulk of the weight being at the ends of the said bars to distribute the weight evenly and balance the tongs, substantially as and for the purpose described.

7. In an oyster-tongs, the combination, with the levers having jaws, of the releasing-cord attached to the lever and passing over a sheave on the jaw and through a guide-eye on the lever, substantially as described.

In testimony whereof I affix my signature in presence of two witnesses.

JAMES B. TAWES.

Witnesses:
S. A. TERRY,
J. H. RIGGLES.